United States Patent [19]

Sugita et al.

[11] Patent Number: 5,665,460
[45] Date of Patent: Sep. 9, 1997

[54] MAGNETIC RECORDING MEDIUM

[75] Inventors: Ryuji Sugita; Kiyokazu Tohma, both of Hirakata; Tatsuaki Ishida, Sakai; Kazunari Yoshimoto, Kyoto, all of Japan

[73] Assignee: Matsushita Electric Industrial Co., Ltd., Osaka, Japan

[21] Appl. No.: 548,422

[22] Filed: Oct. 26, 1995

[30] Foreign Application Priority Data

Nov. 1, 1994 [JP] Japan ................................ 6-268703

[51] Int. Cl.$^6$ ........................................ G11B 5/66
[52] U.S. Cl. ................. 428/212; 428/336; 428/694 TM; 428/900
[58] Field of Search ...................... 428/212, 336, 428/694 TM, 900

[56] References Cited

U.S. PATENT DOCUMENTS 5,418,059  5/1995  Sugita et al. ..................... 428/332

FOREIGN PATENT DOCUMENTS

| 0443478 | 8/1991 | European Pat. Off. . |
| 0597480 | 5/1994 | European Pat. Off. . |
| 63-10314 | 1/1988 | Japan . |
| 63-10315 | 1/1988 | Japan . |
| 63-102020 | 5/1988 | Japan . |
| 63-197026 | 8/1988 | Japan . |
| 3-242818 | 10/1991 | Japan . |

*Primary Examiner*—Stevan A. Resan
*Attorney, Agent, or Firm*—Wenderoth, Lind & Ponack

[57] ABSTRACT

A magnetic recording medium having a first magnetic layer positioned on a substrate and a second magnetic layer positioned on the first magnetic layer, wherein the first magnetic layer is a film of a partial oxide based on Co in which a growth direction of crystalline grain is substantially normal to the film plane and the easy magnetization axis is in a direction of the film plane or direction substantially normal to the film plane, and the second magnetic layer is a film of a partial oxide based on Co in which the growth direction of crystalline grain is diagonally inclined to the line normal to the film plane and the easy magnetization axis is diagonally inclined to the line normal to the film plane.

16 Claims, 2 Drawing Sheets

MAGNETIC RECORDING MEDIUM

BACKGROUND OF THE INVENTION

1. Field of the invention

The present invention relates to a magnetic recording medium giving a high S/N ratio.

2. Description of Related Art

Magnetic recording and reproducing equipment has a higher density year by year and a magnetic recording medium having excellent record and reproduction property at a short wave length is required. In order to satisfy this requirement, a thin film magnetic recording medium is developed. The thin film magnetic recording medium is prepared by a vacuum deposition method, a spattering method, a plating method and the like and has an excellent record and reproduction property at a short wave length. Co, Co—Ni, Co—Ni—P, Co—O, Co—Ni—O, Co—Cr, Co—Ni—Cr, Co—Cr—Ta, Co—Cr—Pt and the like are studied for a magnetic layer of the thin film magnetic recording medium.

When the thin film magnetic recording medium is practically used as a magnetic tape, the vacuum deposition method is most suitable for the preparation method. A vacuum deposited tape having a Co—Ni—O magnetic layer positioned on a polymer substrate has been practically used as a Hi-8 type VCR tape.

The magnetic layer in the vacuum deposited tape comprises crystalline grains grown in a direction diagonally inclined to a line normal to the film plane and has an easy magnetization axis inclined to a line normal to the film plane. Namely, the easy magnetization axis is not present in the film plane or in a direction normal to the film plane but is present in a direction diagonally inclined to the normal line and in the normal plane including an incident direction of evaporated atoms to the substrate. In the commercially available vacuum deposited tape for Hi-8 type VCR, the easy magnetization axis inclines at 70° . to the line normal to the film in the normal plane including a longitudinal direction of the tape. The longitudinal direction of the tape means a direction along the length of the tape.

In future, the magnetic recording and reproducing equipment will be required to be miniaturized and have a larger capacity. In order to satisfy this requirement, it is necessary to improve a linear recording density and a track density. Therefore, the magnetic tape is required to have a high S/N ratio, particularly a high S/N ratio in a short wave length range.

SUMMARY OF THE INVENTION

The present invention provides a magnetic recording medium comprising a first magnetic layer positioned on a substrate and a second magnetic layer positioned on the first magnetic layer wherein the first magnetic layer comprises a film of a partial oxide based on Co in which a growth direction of crystalline grain is substantially normal to the film plane and the easy magnetization axis is in a direction of the film plane or direction substantially normal to the film plane, and the second magnetic layer comprises a film of a partial oxide based on Co in which a growth direction of crystalline grain is diagonally inclined to the line normal to the film plane and the easy magnetization axis is in a direction diagonally inclined to the line normal to the film plane.

The term "substantially normal" means that an angle between the normal line and the growth direction or easy magnetization axis is usually smaller than 20°, preferably smaller than 10°. The term "diagonally inclined" means that an angle between the normal line and the growth direction or easy magnetization axis is usually 20° . to 85°, preferably 30° . to 80°. The oxygen content of the partial oxide is usually 5 to 48% by atom, preferably 10 to 45% by atom.

In the magnetic recording medium of the present invention, since the second magnetic layer or the combination of the second magnetic layer and a third magnetic layer having a significant effect on the record and production property can have a high magnetic anisotropy, a high S/N ratio can be obtained at a short wave length range.

DETAILED DESCRIPTION OF PREFERRED EMBODIMENTS

Figure 1:
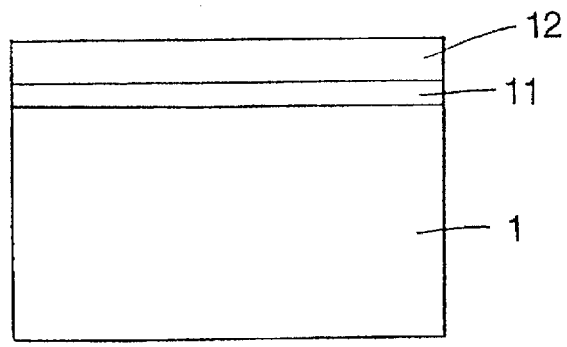
FIG. 1 is a schematic view of the basic construction of a first embodiment of the magnetic recording medium of the present invention.

The magnetic recording medium of the present invention is explained with reference to FIGS. 1—3. FIG. 1 shows the basic construction of the first embodiment of the magnetic recording medium of the present invention. Numeral 1 stands for a polymer substrate. Numeral 11 stands for a first magnetic layer of a partial oxide based on Co in which the growth direction of crystalline grain is substantially normal to a film plane and the easy magnetization axis is in a direction of the film plane or a direction substantially normal to the film plane. Numeral 12 stands for a second magnetic layer of a partial oxide based on Co in which the growth direction of crystalline grain is diagonally inclined to the line normal to the film plane and the easy magnetization axis is in a direction diagonally inclined to the line normal to the film plane. The above construction gives the S/N ratio larger than the conventional vacuum deposited tape having one magnetic layer or a plurality of magnetic layers having the same characteristics and positioned on the substrate.

The main reason why the construction of the present invention shown in FIG. 1 gives the S/N ratio higher than the conventional tape is supposed to be that, when the second magnetic layer of the partial oxide based on Co in which the growth direction of crystalline grain is in the direction diagonally inclined to the line normal to the film plane and the easy magnetization axis is in the direction diagonally inclined to the line normal to the film plane, is positioned on the first magnetic layer of the partial oxide based on Co in which the growth direction of crystalline grain is substantially normal to a film plane and an easy magnetization axis is in a direction of the film plane or a direction substantially normal to the film plane, the first magnetic layer has a coercive force and squareness ratio larger than the second magnetic layer directly formed on the polymer substrate. The reason for the high coercive force and squareness ratio is that a crystal graphic orientation is improved. For example, in the case that the first magnetic layer formed directly on the polymer substrate had the coercive force of 100 kA/m and the squareness ratio of 0.85, the second magnetic layer formed on the first magnetic layer in the same preparation conditions as in the above had the coercive force of 130 kA/m and the squareness ratio of 0.92. The reproduction output at a recorded wave length of 0.5 µm in the presence of the first magnetic layer was higher by about 3 dB than the reproduction output in the absence of the first magnetic layer.

In order to give the above effect, the element forming the first magnetic layer is almost the same as the element forming the second magnetic layer. The reason for this is supposed to be that the first magnetic layer should improve the crystal graphic orientation of the second magnetic layer. Therefore, when the second magnetic layer is the partial oxide of Co, the effects of the present invention cannot be achieved if the element of the first magnetic layer is different from the element of the second magnetic layer or the first magnetic layer has metal Co instead of the partial oxide of Co. The full oxide of Co does not give the effect of the present invention. Namely, when the second magnetic layer comprises a partial oxide of Co, the first magnetic layer comprises the partial oxide of Co.

After conducting many experiments, we discovered that in the first magnetic layer, the growth direction of crystalline grain is substantially normal to the film plane and an easy magnetization axis is in the direction of the film plane or the direction substantially normal to the film plane so as to achieve the effects of the present invention. The reason for this is that, when the first magnetic layer grows as indicated above, the second magnetic layer has the best crystal graphic orientation. If the direction of crystalline grain growth of the first magnetic layer diagonally inclines to the line normal to the film plane, the crystal graphic orientation of the second magnetic layer is not improved due to the poor crystal graphic orientation.

As explained above, a main effect of the first magnetic layer in the present invention is to improve the magnetic property of the second magnetic layer. In order to give such effect, the first magnetic layer preferably has the thickness of at least 2 nm. If the thickness is smaller than 2 nm, the property of magnetic recording medium is nearly the same as the property in the absence of the first magnetic layer.

When the product of the first magnetic layer thickness multiplied by the saturation magnetization of the first magnetic layer is larger than one third of the product of the second magnetic layer thickness multiplied by the saturation magnetization of the second magnetic layer, the magnetic property of the first magnetic layer gives an adverse effect on the record and reproduction property to decrease the S/N ratio. The reason for this is supposed as follows. The magnetization recorded in the first magnetic layer has a phase different from the phase of magnetization recorded in the second magnetic layer, since the distances from the magnetic head and the easy magnetization axis directions are different. Therefore, particularly in the short wave length range, magnetic fluxes evolved from each magnetic layer interfere each other to decrease the reproduction output.

In order to give high reproduction output, each of the first magnetic layer and the second magnetic layer is the film of the partial oxide based on Co and the oxygen content in the first magnetic layer is preferably higher than the oxygen content in the second magnetic layer. This gives the high reproduction output, because the crystal graphic orientation of the second magnetic layer is improved and the magnetization amount of the first magnetic layer gives no adverse effect on the S/N ratio, when the second magnetic layer preferably has the available smallest oxygen content provided that satisfactory magnetic properties are achieved, and the first magnetic layer preferably has the available largest oxygen content provided that the first magnetic layer is the partial oxide.

Figure 2:
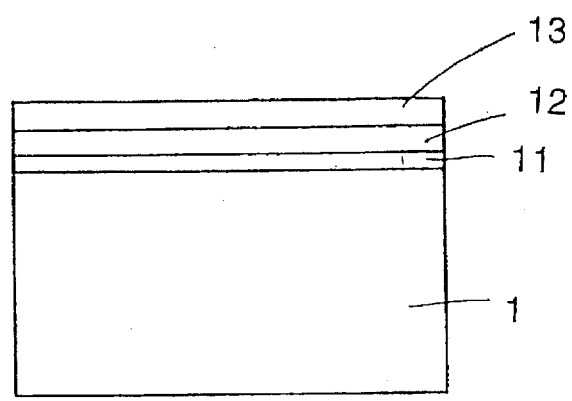
FIG. 2 is a schematic view of the basic construction of a second embodiment of the magnetic recording medium of the present invention.

FIG. 2 shows the basic construction of the second embodiment of the magnetic recording medium of the present invention. A first magnetic layer 11 of a partial oxide based on Co in which the growth direction of crystalline grain is substantially normal to a film plane and the easy magnetization axis is in a direction of the film plane or a direction substantially normal to the film plane, is formed on a substrate 1, a second magnetic layer 12 of a partial oxide based on Co in which the growth direction of crystalline grain is diagonally inclined to the line normal to the film plane and the easy magnetization axis is diagonally inclined to the line normal to the film plane, is formed on the first magnetic layer 11, and a third magnetic layer 13 of a partial oxide based on Co in which a growth direction of crystalline grain is diagonally inclined to the line normal to the film plane and the easy magnetization axis is diagonally inclined to the line normal to the film plane is formed on the second magnetic layer 12. This construction decreases the noise in comparison with the first embodiment of the present invention shown in FIG. 1.

The reason for this is that, when the total thickness of the second and third magnetic layers in the construction of FIG. 2 is the same as the second magnetic layer thickness in the construction of FIG. 1, the construction of FIG. 2 has a smaller crystalline grain size. The smaller crystalline grain size gives a narrower magnetization transition width and smaller noise when signals are recorded.

In the construction of FIG. 2, as in the construction of FIG. 1, the thickness of the first magnetic layer is preferably at least 2 nm and the product of the first magnetic layer thickness multiplied by the saturation magnetization of the first magnetic layer is preferably at most one third of the product of the total thickness of the second and third magnetic layers multiplied by the saturation magnetization of the second and third magnetic layers. The reason for this is the same as in the construction of FIG. 1.

For the same reason as explained in the construction of FIG. 1, the oxygen content of the first magnetic layer is preferably larger than the oxygen content of the second and third magnetic layers.

Figure 3:
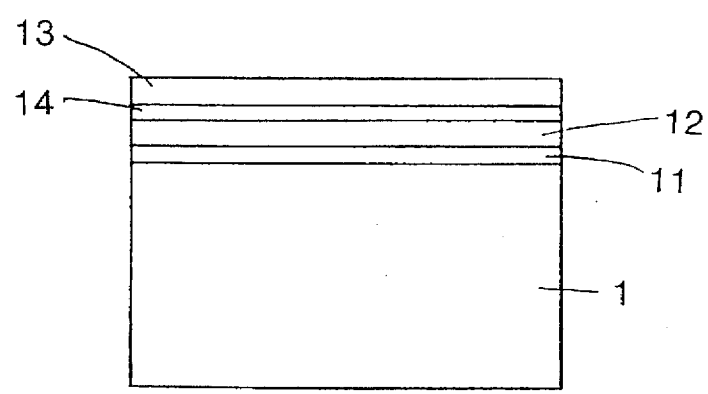
FIG. 3 is a schematic view of the basic construction of a third embodiment of the magnetic recording medium of the present invention.

FIG. 3 shows the basic construction of the third embodiment of the magnetic recording medium of the present invention. A first magnetic layer 11 of a partial oxide based on Co in which the growth direction of crystalline grain is substantially normal to a film plane and the easy magnetization axis is in a direction of the film plane or a direction substantially normal to the film plane, is formed on a substrate 1, a second magnetic layer 12 of a partial oxide based on Co in which the growth direction of crystalline grain is diagonally inclined to the line normal to the film plane and the easy magnetization axis is diagonally inclined to the line normal to the film plane, is formed on the first magnetic layer 11, a fourth magnetic layer 14 of a partial oxide based on Co in which the growth direction of crystalline grain is substantially normal to the film plane and the easy magnetization axis is in a direction of the film plane, is formed on the second magnetic layer 12, and a third magnetic layer 13 of a partial oxide based on Co in which a growth direction of crystalline grain is diagonally inclined to the line normal to the film plane and the easy magnetization axis is diagonally inclined to the line normal to the film plane, is formed on the fourth magnetic layer 14. This construction increases the reproduction output and decreases the noise in comparison with the second embodiment of the present invention shown in FIG. 2.

The reason for this is that the construction of FIG. 3 improves the crystal orientation of the third magnetic layer in comparison with the construction of FIG. 2 and the third magnetic layer grows almost completely independent of the second magnetic layer. The improvement of the crystal graphic orientation of the third magnetic layer increases the reproduction output in comparison with the construction of FIG. 2, and the growth of the third magnetic layer almost completely independent of the second magnetic layer decreases the noise in comparison with the construction of FIG. 2.

In the construction of FIG. 3, as in the construction of FIG. 1, the thickness of each of the first magnetic layer and the fourth magnetic layer is preferably at least 2 nm and the product of the total thickness of the first and fourth magnetic layers multiplied by the saturation magnetization of the first and fourth magnetic layers is preferably at most one third of the product of the total thickness of the second and third magnetic layers multiplied by the saturation magnetization of the second and third magnetic layers. The reason for this is the same as in the construction of FIG. 1.

For the same reason as explained in the construction of FIG. 1, the oxygen contents of the first and fourth magnetic layers are preferably larger than the oxygen contents of the second and third magnetic layers.

Figure 4:
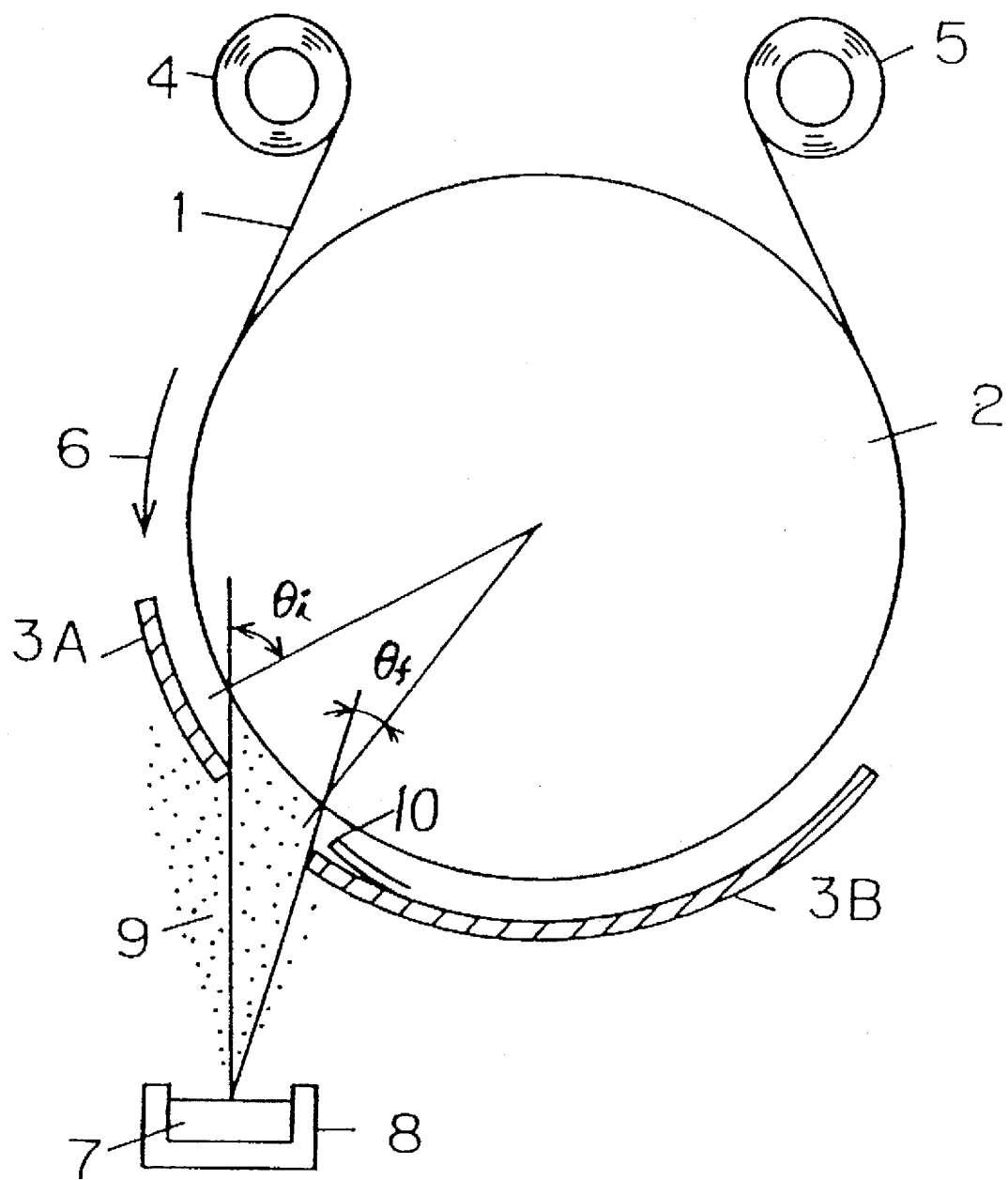
FIG. 4 is a schematic view the an internal part of a vacuum deposition apparatus used for the method for preparing the magnetic recording medium of the present invention.

One example of a method for preparing the magnetic recording medium of the present invention is explained with reference to FIG. 4. FIG. 4 shows one embodiment of an internal part of vacuum deposition apparatus for preparing the magnetic recording medium of the present invention. When the first magnetic layer is formed, a polymer substrate 1 runs along a surface of a cylindrical can 2 in the direction of an arrow 6. Shield plates 3A and 3B are positioned between an evaporation source 8 and the cylindrical can 2. Evaporated atoms 9 pass through an opening part of the shield plates and attach to the polymer substrate 1. An evaporation material 7 is Co and a Co alloy such as Co—Ni and is charged in the evaporation source 8. Oxygen is introduced into a vacuum chamber through an oxygen inlet 10. The oxygen inlet 10 for preparing the first magnetic layer or fourth magnetic layer is not limited to the position shown in FIG. 4. For example, the oxygen inlet 10 may be positioned between the shield plate 3A and the cylindrical can 2 or between the shield plate and the evaporation source, or a plurality of oxygen inlets may be provided.

$\theta_i$ and $\theta_f$ are incident angles of the evaporated atoms to the polymer substrate 1 at a magnetic layer deposition initiation portion and a magnetic layer deposition termination portion, respectively, when the polymer substrate 1 runs in the direction of arrow 6. When the magnetic layer is formed by running the polymer substrate in the direction opposite to the arrow 6, $\theta_f$ is the incident angle at the deposition initiation portion and $\theta_i$ is the incident angle at the deposition termination portion. Preferably, $\theta_i$ is adjusted to at most 40°. and $\theta_f$ is adjusted to at least −40°, when the first magnetic layer is formed. The minus of $\theta_f$ means that a line joining the end of the shield plate 3B to the evaporation part of the evaporation source is in right side based on a line joining the center of the cylindrical can 2 to the evaporation part of the evaporation source. When the magnetic layer is formed by adjusting $\theta_i$ and $\theta_f$ as the above and introducing the oxygen, the first magnetic layer in which the growth of crystalline grain is substantially normal to the film plane and the easy magnetization axis is in the direction of the film plane or in the direction substantially normal to the film plane is formed. If the introduction of only oxygen does not give the above result, a mixture of oxygen with other gas such as argon and nitrogen may be introduced. The resultant magnetic layer having the thickness of at most about 30 or 40 nm has the easy magnetization axis in the direction of the film plane. The resultant magnetic layer having the thickness larger than the above has the easy magnetization axis in the direction substantially normal to the film plane. The film thickness at the change from the direction of film plane to the direction substantially normal to the film plane depends on the incident angle, the atmosphere, the oxygen content, the substrate temperature and the like. Numerals 4 and 5 stand for rollers on which the polymer substrate is would.

A method for preparing the second magnetic layer is explained. The polymer substrate having the first magnetic layer formed thereon and wound on the roller 5 is run in a direction opposite to the arrow 6 along the circumference of the cylindrical can 2 and wound back on the roller 4. In this case, the power source of the evaporation source is turned off to discontinue the evaporation. Alternatively, the opening part between the shield plates 3A and 3B is closed by a shutter (not shown) to prevent the adhesion of the evaporated atoms 9 to the polymer substrate. Then, the polymer substrate 1 is run in the direction of arrow 6 to form the second magnetic layer. In this case, $\theta_i$ is at least 60°. and $\theta_i$ is at least 30°. The evaporation material 7 of a Co alloy is previously charged in the evaporation source 8. Oxygen is introduced through the oxygen inlet 10 into the vacuum chamber. When the second magnetic layer or the third magnetic layer is formed, the introduction of oxygen from the neighborhood of the deposition termination portion to the deposition part gives the magnetic layer having the excellent property. In the above manner, the second magnetic layer in which the growth direction of the crystalline grain is diagonally inclined to the line normal to the film plane and the easy magnetization axis is in the direction diagonally inclined to the line normal to the film plane is formed.

By the above method, the magnetic recording medium having the construction shown in FIG. 1 can be prepared.

Although, in the above embodiment, the example in which the first magnetic layer is formed by running the polymer substrate 1 in the direction of arrow 6 in FIG. 4, the polymer substrate 1 is wound back in the direction opposite to the arrow 6, and the second magnetic layer is formed by running the polymer substrate 1 in the direction of the arrow 6 is explained, the method of the present invention is not limited to this example. For example, in FIG. 4, after the first magnetic layer is formed by running the polymer substrate 1 in the direction opposite to the arrow 6, the second magnetic layer may be formed by running the polymer substrate 1 in the direction of arrow 6. Alternatively, by the modification of the vacuum deposition apparatus, the first magnetic layer and the second magnetic layer are simultaneously formed by one running of the polymer substrate.

When the third magnetic layer and the fourth magnetic layer are formed, the method as described above may be conducted.

Specific Examples will be illustrated as follows.

EXAMPLE 1

Example 1 relates to the first embodiment shown in FIG. 1. The first magnetic layer 11 was formed by running the polymer substrate 1 in the direction opposite to the arrow 6 by the apparatus shown in FIG. 4. After the evaporation material 7 of Co is filled in the evaporation source 8, the vapor deposition was conducted. The cylindrical can had the diameter of 1 m and the surface temperature of room temperature. The polymer substrate was a polyethylene terephthalate film having the film thickness of 6 μm. $\theta_i$ was 20°. and $\theta_f$ was −20°. Oxygen in the amount of 2 L/min was introduced from the oxygen inlet 10 into the vacuum chamber. Thus, the first magnetic layer having the thickness of 0.01 μm was formed at the average film deposition rate of 0.1 μm/s. When the cross section of the magnetic layer was observed by a transmission electron microscope (TEM), the growth direction of the crystalline grain was substantially normal to the film plane. When the magnetic anisotropy of the magnetic layer was measured by a torque meter, the direction of the easy magnetization axis was in the film plane. The product of the film thickness multiplied by the saturation magnetization in the first magnetic layer was 3 μm.KA/m.

Then the polymer substrate having the first magnetic layer was run in the direction of the arrow 6 to prepare the second magnet layer 12. Co which was used in the formation of the first magnetic layer was used as the evaporation material 7. The cylindrical can 2 had the surface temperature of room temperature. $\theta_i$ was 90°. and $\theta_f$ was 55°. Oxygen in the amount of 0.8 L/min was introduced from the oxygen inlet 10. Thus, the second magnetic layer having the thickness of 0.1 μm was formed at the average film deposition rate of 0.1 μm/s. The growth direction of the crystalline grain in the second magnetic layer was diagonally inclined to the line normal to the film plane. The direction of the easy magnetization axis was diagonally inclined to the line normal to the film plane. The product of the film thickness multiplied by the saturation magnetization in the second magnetic layer was 60 μm.kA/m.

According to the Auger electron spectroscopy of the oxygen content of the magnetic layer in Example 1, the oxygen content of the first magnetic layer was about 40% by atom and the oxygen content of the second magnetic layer was about 20% by atom.

EXAMPLE 2

In the same manner as in Example 1 except that the thickness of the first magnetic layer was changed, the sample of Example 2 was prepared. Namely, the thickness of the first magnetic layer was 0.05 μm. The growth direction of crystalline grain of the first magnetic layer was substantially normal to the film plane. The easy magnetization axis was substantially normal to the film plane. The product of the film thickness multiplied by the saturation magnetization was 15 μm·kA/m.

EXAMPLE 3

The sample of Example 3 was prepared in the same manner as in Example 1 except that the first magnetic layer had the thickness of 1.5 nm. In the first magnetic layer of this sample, the growth direction of crystalline grain was substantially normal to the film plane and the easy magnetization axis was in the film plane.

EXAMPLE 4

The sample of Example 4 was prepared in the same manner as in Example 1, except that the amount of oxygen introduced from the oxygen inlet 10 at the formation of the first magnetic layer was 0.8 L/min and the thickness of the first magnetic layer was 0.03 μm. In the first magnetic layer of this sample, the growth direction of the crystalline grain was substantially normal to the film plane and the easy magnetization axis was in the film plane. The product of the film thickness multiplied the saturation magnetization in the first magnetic layer was 24 μm·KA/m.

EXAMPLE 5

The sample of Example 5 as prepared in the same manner as in Example 1, except that the thickness of the first magnetic layer was 0.08 μm. In the first magnetic layer of this sample, the growth direction of the crystalline grain was substantially normal to the film plane and the easy magnetization axis was substantially normal to the film plane. The product of the film thickness multiplied by the saturation magnetization in the first magnetic layer was 24 μm·KA/m.

EXAMPLE 6

The sample of the Example 6 was prepared in the same manner as in Example 1 except that only the oxygen content of the first magnetic layer was changed. Namely, the amount of oxygen introduced from the oxygen inlet 10 at the formation of the first magnetic layer was 0.6 L/min and the other conditions were the same as in Example 1. In the first magnetic layer, the growth direction of crystalline grain was substantially normal to the film plane and the easy magnetization axis direction was in the film plane. The product of the film thickness multiplied by the saturation magnetization in the first magnetic layer was 9 μm·kA/m. The oxygen content of the first magnetic layer was about 15% by atom.

COMPARATIVE EXAMPLE 1

The second magnetic layer formed in Example 1 was directly positioned on the polymer substrate 1 to prepare the magnetic recording medium having the single layer. In the magnetic layer, the growth direction of crystalline grain was diagonally inclined to the line normal to the film plane and the easy magnetization direction was diagonally inclined to the line normal to the film plane.

COMPARATIVE EXAMPLE 2

The sample of Comparative Example 2 was prepared in the same manner as in Example 1 except that the amount of oxygen introduced from the oxygen inlet was zero at the formation of the first magnetic layer.

COMPARATIVE EXAMPLE 3

The sample of Comparative Example 3 had a nonmagnetic CoO layer formed instead of the first magnetic layer in Example 1. The sample of Comparative Example 3 was prepared in the same manner as in Example 1 except that the amount of oxygen introduced from the oxygen inlet 10 into the vacuum chamber was 5 L/min at the formation of the first magnetic layer of Example 1.

COMPARATIVE EXAMPLE 4

As in FIG. 4, the first magnetic layer was formed by running the polymer substrate 1 in the direction of arrow 6. Co which was filled in the evaporation source 8 was used as the evaporation material 7. The cylindrical can 2 had the diameter of 1 m and the surface temperature of room temperature. The polymer substrate 1 was a polyethylene terephthalate film having the thickness of 6 μm. $\theta_i$ was adjusted to be 90°. and $\theta_f$ was adjusted to be 55°. Oxygen in the amount of 2 L/min was introduced from the oxygen inlet 10 into the vacuum chamber. Thus, the first magnetic layer having the thickness of 0.05 μm was formed at the average film deposition rate of 0.1 μm/s. In the first magnetic layer, the growth direction of the crystalline grain was diagonally inclined to the line normal to the film plane and the direction of the easy magnetization axis was diagonally inclined to the line normal to the film plane. The product of the film thickness multiplied by the saturation magnetization in the first magnetic layer was 15 μm·kA/m.

Then the polymer substrate having the first magnetic layer which was wound on the roller 5 was run in the direction opposite to the arrow 6 and wound back on the roller 4. In this time, the opening part of the shield was closed by a shutter (not shown). Then, the second magnetic layer was formed in the same manner as in Example 1 by running the polymer substrate 1 having the first magnetic layer in the direction of arrow 6.

EXAMPLE 7

In Example 7, the magnetic recording medium having the second embodiment of FIG. 2 was prepared. The first magnetic layer was formed in the same manner as in the first magnetic layer of Example 1. The second magnetic layer and the third magnetic layer were prepared in the same manner as in the second magnetic layer of Example 1 except that the thickness of each of the second and third magnetic layers was 0.05 μm.

EXAMPLE 8

In EXAMPLE 8, the magnetic recording medium had the third embodiment of FIG. 3. The sample of Example 8 was prepared in the same manner as in Example 7 except that the fourth magnetic layer was additionally formed. The fourth magnetic layer was formed on the substrate 1 having the first magnetic layer and the second magnetic layer in the same manner as in the first magnetic layer.

Each of the magnetic recording media in the above Examples was cut into tapes. The record and reproduction property of the tapes was evaluated by using a ring-shaped magnetic-head of Sendust having a gap length of 0.15 μm. The results are shown in the Table.

TABLE

|  | Reproduction output (dB) | Noise (dB) |
| --- | --- | --- |
| Example 1 | 0 | 0 |
| Example 2 | 0 | 0 |
| Example 3 | −1 | +1 |
| Example 4 | −2 | +1 |
| Example 5 | −1 | +1 |
| Example 6 | −2 | +1 |
| Com. Ex. 1 | −3 | +2 |
| Com. Ex. 2 | −3 | +2 |
| Com. Ex. 3 | −3 | +1 |
| Com. Ex. 4 | −3 | +1 |
| Example 7 | 0 | −2 |
| Example 8 | +1 | −3 |

The reproduction output is expressed by the numerical value when the signal having a recording wave length of 0.5 μm was recorded. The noise is expressed by the numeral value at the frequency corresponding to the wavelength of 0.6 μm at this time. Since the measurement was conducted at the rate of 4.5 m/s of the tape relative to the head, the measurement frequency was 9 MHz and the noise was the numerical value at the 7.5 MHz. Both of the reproduction output and the noise were expressed as the relative value in which the sample of Example 1 was 0 dB.

As clear from the Table, Examples 1—8 have higher reproduction and not higher noise than Comparative Examples 1—4 and have the high S/N ratio.

Examples 1—6 relate to the samples having the first magnetic layer and the second magnetic layer and have higher reproduction output and not higher noise than the samples of Comparative Examples 1—4. The most excellent properties are possessed by Examples 1 and 2 in which the first magnetic layer has the thickness of at least 2 nm, the product of the thickness multiplied by the saturation magnetization in the first magnetic layer is not larger than one third of the product of the thickness multiplied by the saturation magnetization in the second magnetic layer, and the oxygen content in the first magnetic layer is larger than the oxygen content in the second magnetic layer.

The easy magnetization axis in Example 1 has the different direction from the easy magnetization axis in Example 2. The easy magnetization axis in Example 1 is in the film plane and the easy magnetization axis in Example 2 is in the direction substantially normal to the film plane. Both of Examples 1 and 2 have almost the same record and reproduction properties. Therefore, the easy magnetization axis of the first magnetic layer may be in the direction of the film plane or in the direction substantially normal to the film plane. However, when the crystalline grain growth direction and the easy magnetization axis of the first magnetic layer are diagonally inclined as in Comparative Example 4, the high S/N ratio cannot be obtained.

In Example 3, since the thickness of the first magnetic layer is smaller than 2 nm, the reproduction output is smaller by 1 dB than that of Example 1 and the noise is larger by 1 dB than that of Example 1. In Examples 4 and 5, since the product of the thickness of the first magnetic layer multiplied by the saturation magnetization of the first magnetic layer is larger than one third of the product of the thickness of the second magnetic layer multiplied by the saturation magnetization of the second magnetic layer, the reproduction output is smaller by 1—2 dB than that of Example 1 and the noise is larger by 1 dB than that of Example 1. In Example 6, since the oxygen content in the first magnetic layer is smaller than the oxygen content in the second magnetic layer, the reproduction output is smaller by 2 dB than that of Example 1 and the noise is larger by 1 dB than that of Example 1.

In Example 7 relating to the second embodiment of the present invention, since the number of the magnetic layers having the easy magnetization axis in the diagonal direction is two, lower noise is obtained in comparison with Example 1.

In Example 8 relating to the third embodiment of the present invention, since the fourth magnetic layer is added, higher output and lower noise are obtained in comparison with Example 1.

As described above, the present invention gives a better record and reproduction property in comparison with Comparative Examples. The sample of Example 1 has higher reproduction output by 6 dB and lower noise by 1 dB than the commercially available vacuum deposited magnetic tape for Hi-8 type VCR.

In the above, the provision of the magnetic recording medium having excellent record and reproduction properties was illustrated when the first magnetic layer or the fourth magnetic layer of Co—0 is prepared by adjusting $\theta_i$ to 20° . and $\theta_f$ to −20°, and the second magnetic layer, or the third magnetic layer of Co—O is prepared by adjusting $\theta_i$ to 90° and $\theta_f$ 55°. Even if the preparation conditions, preparation methods and compositions and film thickness are other than those described above, the excellent record and reproduction properties can be obtained, provided that the crystalline grain growth direction of the first magnetic layer is substantially normal to the film plane, the easy magnetization axis of the first magnetic layer is in the film plane or in the direction normal to the film plane, the crystalline grain growth directions of the second and third magnetic layers are diagonally inclined to line normal to the film plane, the easy magnetization axes of the second and third magnetic layers are diagonally inclined to the line substantially normal to the film plane, the growth direction of the crystalline grain of the fourth magnetic layer is substantially normal to the film plane, and the easy magnetization axis of the fourth magnetic layer is in direction of the film plane.

The composition of the magnetic layer is not limited to the Co—O illustrated above, and the layers which comprises Co—Ni—O, Co—Fe—O, Co—Ni—Fe—O or the like can give the high output. The substrate is not limited to the polyethylene terephthalate film illustrated above and, a polymer film such as a polyethylene naphthalate film, a polyimide film, a polyamide film, a polyetherimide film and the like can be used. The thickness of the substrate is not limited.

What is claimed is:

1. A magnetic recording medium comprising a first magnetic layer positioned on a substrate and a second magnetic layer positioned on the first magnetic layer, wherein the first magnetic layer comprises a film of a partial oxide comprising Co having an oxygen content of 5 to 48% by atom in which a growth direction of crystalline grain is substantially normal to the film plane and the easy magnetization axis is in a direction of the film plane, and the second magnetic layer comprises a film of a partial oxide comprising Co having an oxygen content of 5 to 48% by atom in which the growth direction of crystalline grain is inclined at an angle of 20° to 85° to the line normal to the film plane and the easy magnetization axis is inclined at an angle of 20° to 85° to the line normal to the film plane.

2. A magnetic recording medium comprising a first magnetic layer positioned on a substrate and a second magnetic layer positioned on the first magnetic layer, wherein the first magnetic layer comprises a film of a partial oxide comprising Co having an oxygen content of 5 to 48% by atom in which a growth direction of crystalline grain is substantially normal to the film plane and the easy magnetization axis is in a direction substantially normal to the film plane, and the second magnetic layer comprises a film of a partial oxide comprising Co having an oxygen content of 5 to 48% by atom in which the growth direction of crystalline grain is inclined at an angle of 20° to 85° to the line normal to the film plane and the easy magnetization axis is inclined at an angle of 20° to 85° to the line normal to the film plane.

3. The magnetic recording medium according to claim 1 or 2, wherein the thickness of the first magnetic layer is at least 2 nm and the product of the thickness of the first magnetic layer multiplied by the saturation magnetization of the first magnetic layer is not larger than one third of the product of the thickness of the second magnetic layer multiplied by the saturation magnetization of the second magnetic layer.

4. The magnetic recording medium according to claim 1 or 2, wherein the first magnetic layer has a higher oxygen content than the second magnetic layer.

5. A magnetic recording medium comprising a first magnetic layer positioned on a substrate, a second magnetic layer positioned on the first magnetic layer and a third magnetic layer positioned on the second magnetic layer, wherein the first magnetic layer comprises a film of a partial oxide comprising Co having an oxygen content of 5 to 48% by atom in which a growth direction of crystalline grain is substantially normal to the film plane and the easy magnetization axis is in a direction of film plane, the second magnetic layer comprises a film of a partial oxide comprising Co having an oxygen content of 5 to 48% by atom in which the growth direction of crystalline grain is inclined at an angle of 20° to 85° to the line normal to the film plane and the easy magnetization axis is inclined at an angle of 20° to 85° to the line normal to the film plane, and the third magnetic layer comprises a film of a partial oxide comprising Co having an oxygen content of 5 to 48% by atom in which the growth direction of crystalline grain is inclined at an angle of 20° to 85° to the line normal to the film plane and the easy magnetization axis is inclined at an angle of 20° to 85° to the line normal to the film plane.

6. A magnetic recording medium comprising a first magnetic layer positioned on a substrate, a second magnetic layer positioned on the first magnetic layer and a third magnetic layer positioned on the second magnetic layer, wherein the first magnetic layer comprises a film of a partial oxide comprising Co having an oxygen content of 5 to 48% by atom in which a growth direction of crystalline grain is substantially normal to the film plane and the easy magnetization axis is in a direction substantially normal to the film plane, the second magnetic layer comprises a film of a partial oxide comprising Co having an oxygen content of 5 to 48% by atom in which the growth direction of crystalline grain is inclined at an angle of 20° to 85° to the line normal to the film plane and the easy magnetization axis is inclined at an angle of 20° to 85° to the line normal to the film plane, and the third magnetic layer comprises a film of a partial oxide comprising Co having an oxygen content of 5 to 48% by atom in which the growth direction of crystalline grain is inclined at an angle of 20° to 85° to the line normal to the film plane and the easy magnetization axis is inclined at an angle of 20° to 85° to the line normal to the film plane.

7. The magnetic recording medium according to claim 5 or 6, wherein the thickness of the first magnetic layer is at least 2 nm and the product of the thickness of the first magnetic layer multiplied by the saturation magnetization of the first magnetic layer is not larger than one third of the product of the total thickness of the second and third magnetic layers multiplied by the saturation magnetization of the second and third magnetic layers.

8. The magnetic recording medium according to claim 5 or 6, wherein the first magnetic layer has a higher oxygen content than the second and third magnetic layers.

9. A magnetic recording medium comprising a first magnetic layer positioned on a substrate, a second magnetic layer positioned on the first magnetic layer, a fourth magnetic layer positioned on the second magnetic layer and a third magnetic layer positioned on the fourth magnetic layer, wherein the first magnetic layer comprises a film of a partial oxide comprising Co having an oxygen content of 5 to 48% by atom in which a growth direction of crystalline grain is substantially normal to the film plane and the easy magnetization axis is in a direction of the film plane, the second magnetic layer comprises a film of a partial oxide comprising Co having an oxygen content of 5 to 48% by atom in which the growth direction of crystalline grain is inclined at an angle of 20° to 85° to the line normal to the film plane and the easy magnetization axis is inclined at an angle of 20° to 85° to the line normal to the film plane, the fourth magnetic layer comprises a film of a partial oxide comprising Co having an oxygen content of 5 to 48% by atom in which the growth direction of crystalline grain is substantially normal to the film plane and the easy magnetization axis is in the direction of film plane, and the third magnetic layer comprises a film of a partial oxide comprising Co having an oxygen content of 5 to 48% by atom in which the growth direction of crystalline grain is inclined at an angle of 20° to 85° to the line normal to the film plane and the easy magnetization axis is inclined at an angle of 20° to 85° to the line normal to the film plane.

10. A magnetic recording medium comprising a first magnetic layer positioned on a substrate, a second magnetic layer positioned on the first magnetic layer, a fourth magnetic layer positioned on the second magnetic layer and a third magnetic layer positioned on the fourth magnetic layer, wherein the first magnetic layer comprises a film of a partial oxide comprising Co having an oxygen content of 5 to 48% by atom in which a growth direction of crystalline grain is substantially normal to the film plane and the easy magnetization axis is in a direction substantially normal to the film plane, the second magnetic layer comprises a film of a partial oxide comprising Co having an oxygen content of 5 to 48% by atom in which the growth direction of crystalline grain is inclined at an angle of 20° to 85° to a line normal to the film plane and the easy magnetization axis is inclined at an angle of 20° to 85° to the line normal to the film plane, the fourth magnetic layer comprises a film of a partial oxide comprising Co having an oxygen content of 5 to 48% by atom in which the growth direction of crystalline grain is substantially normal to the film plane and the easy magnetization axis is in the direction of film plane, and the third magnetic layer comprises a film of a partial oxide comprising Co having an oxygen content of 5 to 48% by atom in which the growth direction of crystalline grain is inclined at an angle of 20° to 85° to the line normal to the film plane and the easy magnetization axis is inclined at an angle of 20° to 85° to the line normal to the film plane.

11. The magnetic recording medium according to claim 9 or 10, wherein the thickness of each of the first and fourth magnetic layers is at least 2 nm and the product of the total thickness of the first and fourth magnetic layers multiplied by the saturation magnetization of the first and fourth magnetic layers is not larger than one third of the product of the total thickness of the second and third magnetic layers multiplied by the saturation magnetization of the second and third magnetic layers.

12. The magnetic recording medium according to claim 9, or 10 wherein the first and fourth magnetic layers have higher oxygen contents than the second and third magnetic layers.

13. The magnetic recording medium according to claim 3, wherein the first magnetic layer has a higher oxygen content than the second magnetic layer.

14. The magnetic recording medium according to claim 7, wherein the first magnetic layer has a higher oxygen content than the second and third magnetic layers.

15. The magnetic recording medium according to claim 11, wherein the first and fourth magnetic layers have higher oxygen contents than the second and third magnetic layers.

16. The magnetic recording medium according to claim 2, 6 or 10, wherein the easy magnetization axis of the first magnetic layer is inclined at an angle of less than 20° to the line normal to the film plane.

* * * * *